United States Patent
Jimenez

(10) Patent No.: US 9,229,770 B2
(45) Date of Patent: Jan. 5, 2016

(54) INVOKING TIMED ITERATOR FOR EXECUTING TASKS WITHIN TIMEOUT CONSTRAINT WITHOUT SPAWNING NEW THREAD

(75) Inventor: Juan Carlos Jimenez, Campbell, CA (US)

(73) Assignee: Skype, Dublin (IE)

( * ) Notice: Subject to any disclaimer, the term of this patent is extended or adjusted under 35 U.S.C. 154(b) by 820 days.

(21) Appl. No.: 13/235,129

(22) Filed: Sep. 16, 2011

(65) Prior Publication Data

US 2013/0074080 A1    Mar. 21, 2013

(51) Int. Cl.
   *G06F 9/46*    (2006.01)
   *G06F 9/48*    (2006.01)

(52) U.S. Cl.
   CPC ................... *G06F 9/4825* (2013.01)

(58) Field of Classification Search
   CPC ................... G06F 9/4825
   See application file for complete search history.

(56) References Cited

U.S. PATENT DOCUMENTS

| 7,921,111 B1* | 4/2011 | Beddow ................. 707/736 |
| 2003/0051062 A1* | 3/2003 | Circenis ................. 709/310 |
| 2003/0078954 A1* | 4/2003 | Haughey ................ 709/102 |
| 2004/0015642 A1 | 1/2004 | Moir et al. |
| 2005/0203958 A1* | 9/2005 | Mitchell et al. ........... 707/104.1 |
| 2006/0069785 A1* | 3/2006 | Barrett ................. 709/229 |
| 2006/0247990 A1* | 11/2006 | Narayanan et al. ........... 705/35 |
| 2007/0198518 A1 | 8/2007 | Luchangvo et al. |
| 2008/0168438 A1* | 7/2008 | Meijer et al. .............. 718/1 |
| 2008/0235324 A1* | 9/2008 | Abernethy et al. ........... 709/201 |
| 2008/0235342 A1 | 9/2008 | Aaltonen et al. |
| 2010/0153927 A1* | 6/2010 | Stall et al. ............. 717/128 |
| 2010/0205613 A1* | 8/2010 | Wang et al. .............. 719/315 |
| 2011/0179364 A1* | 7/2011 | Morris ................. 715/764 |
| 2012/0311273 A1* | 12/2012 | Marathe et al. ............. 711/151 |

OTHER PUBLICATIONS

"Foreign Office Action", CN Application No. 201210339894.8, Sep. 1, 2014, 12 pages.
"Foreign Office Action", CN Application No. 201210339894.8, May 12, 2015, 9 pages.

* cited by examiner

*Primary Examiner* — Mengyao Zhe
*Assistant Examiner* — James J Lee
(74) *Attorney, Agent, or Firm* — Danielle Johnston-Holmes; Micky Minhas; Wolfe-SBMC

(57) ABSTRACT

A computer implemented method for processing tasks is disclosed. The method includes invoking a timed iterator, during an event loop pass, without spawning a new thread, wherein the invoking includes passing a task list and a timeout constraint to the timed iterator. The method further includes executing one or more tasks in the task list for a period of time as specified in the timeout constraint, and relinquishing program control to a caller after the period of time.

20 Claims, 4 Drawing Sheets

INVOKING TIMED ITERATOR FOR EXECUTING TASKS WITHIN TIMEOUT CONSTRAINT WITHOUT SPAWNING NEW THREAD

BACKGROUND OF THE INVENTION

1. Field of the Invention

Embodiments of the present invention relate generally to computer user interface (UI) and more particularly handling UI events.

2. Description of the Related Art

Recently, mobile computers and wireless phones have evolved to replace mainstream desktop computers. These mobile devices run on batteries that are charged from time to time. To support applications and usage that require higher processing power, mobile devices are being manufactured with powerful processors and supporting hardware. This increased processing power, however, has a side effect, that is, high capacity batteries are needed and the batteries need to be charged more frequently. To keep the mobile devices light and small, the battery size cannot be increased beyond a reasonable size and users of these mobile devices may not have access to battery charging means at all time. Hence, prolonging the battery charge cycles would prove to be beneficial by designing software applications that exert less burden on the batteries.

It is common for software applications to use multiple threads to implement task parallelism. In an exemplary software application, many threads may be employed as for example, one thread to retrieve data from an external server and another thread to listen to user interaction with the user interface of the exemplary software application. If there were only one thread handling both the above stated exemplary tasks, the application would become unresponsive to user interactions until the first thread finishes retrieving data from the external server. In the meantime, the user may feel as if the application has "hanged" and may try to kill the application. At the very least, such application designs would provide a reduced quality user experience. On the other hand, using multiple threads for different tasks would lead to higher CPU consumption and would result in an undesirable outcome, that is, the battery would need to be charged more frequently.

Further, it may not be possible in some scenarios to have multiple threads. For example, software applications that include legacy code may not be amended to use multiple threads without making them unstable.

Therefore, what is needed is a mechanism to create single threaded software modules that enables an application to be more responsive to user interactions while performing multiple tasks.

SUMMARY OF THE INVENTION

One embodiment of the present invention sets forth a computer implemented method for processing tasks is disclosed. The method includes invoking a timed iterator, during an event loop pass, without spawning a new thread, wherein the invoking includes passing a task list and a timeout constraint to the timed iterator. The method further includes executing one or more tasks in the task list for a period of time as specified in the timeout constraint, and relinquishing program control to a caller after the period of time.

In another embodiment, a mobile computing device having a processor and an operating system is disclosed. The mobile computing device includes a processor and an operating system. The mobile computing device further includes a user interface controller. The user interface controller including an event handler and a timed iterator, wherein the timed iterator is configured to be invoked during an event loop pass, without spawning a new thread. The invoking of the timed iterator includes passing a task list and a timeout constraint to the timed iterator through an interface. One or more tasks in the task list are executed for a period of time as specified in the timeout constraint. The program control is then relinquished to a caller after the period of time.

In yet another embodiment, a computer readable storage medium containing a program which, when executed, performs an operation of processing tasks is disclosed. The operation includes invoking a timed iterator, during an event loop pass, without spawning a new thread. The invoking includes passing a task list and a timeout constraint to the timed iterator through an interface. The invoking also includes executing one or more tasks in the task list for a period of time as specified in the timeout constraint and relinquishing program control to a caller after the period of time.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
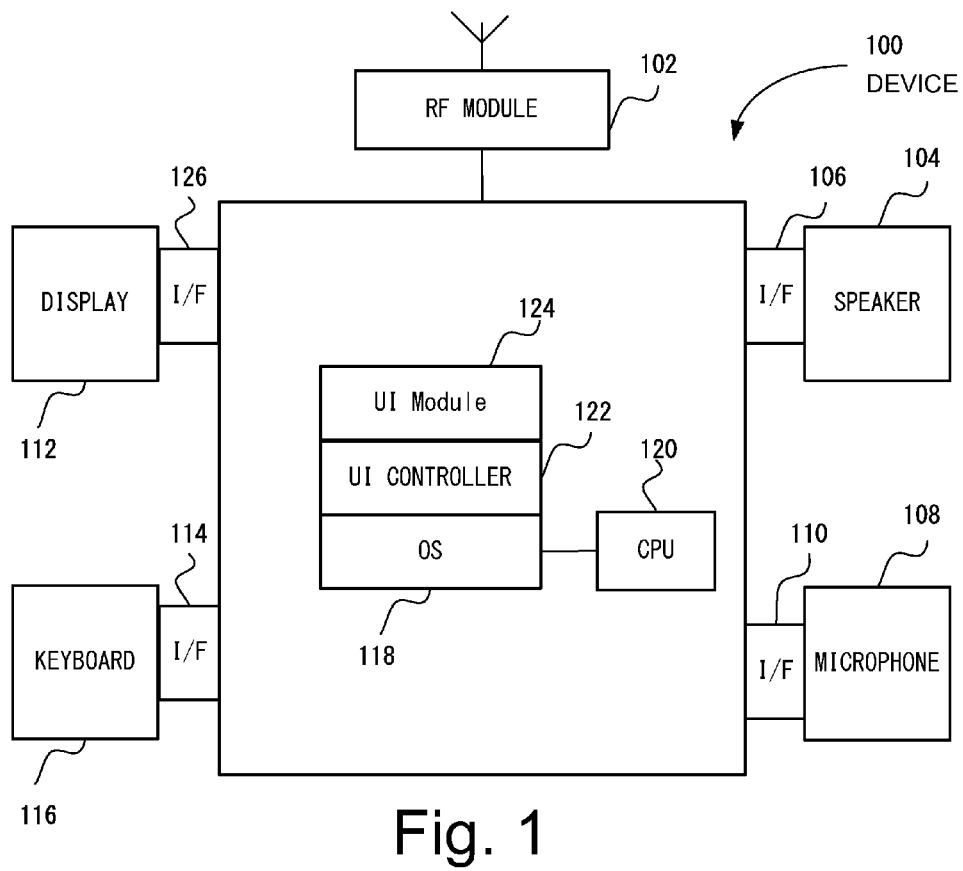
FIG. 1 illustrates some of the functional elements of a mobile device, according to one embodiment of the present invention.

FIG. 1 illustrates some of the functional elements of a mobile device 100. The mobile device 100 comprises a processor 120 (also known a central processing unit ("CPU")), which controls the operation of the mobile device 100 and executes software applications. Connected to the microprocessor is a memory (not shown) and other necessary components that are typically included in or with a CPU, e.g., a display 112 (such as a liquid crystal display ("LCD")), a speaker 104, a microphone 108 and a keyboard 116. A radio frequency ("RF") module 102 is also coupled to the microprocessor, which implements the particular radio communication standard used by the device 100, such as WiFi. The RF signals are transmitted and received from an antenna that is connected to the RF Module 102.

The speaker 104 may be connected to the microprocessor 120 via an interface 106 which comprises audio driver hardware (including for example amplifiers) and a digital to analogue converter. The functionality of the interface 106 may alternatively be integrated into microprocessor. The microphone 108 is connected to the microprocessor 120 via an interface 110 comprising audio receiving hardware (such as amplifiers) and an analogue to digital converter. Again, this functionality may be integrated into the microprocessor 120.

The keyboard 116 is connected to the microprocessor 120 via an encoder interface 114. The display 112 is connected to the microprocessor 120 via a display driver interface 126. The memory can include both Flash and RAM. A serial interface (now shown) may be incorporated for loading and updating software on the microprocessor 120. In one embodiment, the serial interface can also be used as a power source to charge the battery (not shown) in the device 100.

As the microprocessor 120 is operating within a battery powered device, it needs to be of a lower processing power than the CPU inside a general purpose desktop computer. For example, the microprocessor 120 of a handheld device typically works at a substantial lower clock speed compared to a contemporary microprocessor in a desktop computer. In some embodiments, the microprocessor 120 can be complemented by a digital signal processor ("DSP"), which can perform some of the voice processing functions. This allows the microprocessor 120 clock speed to be reduced, predominantly to extend battery charging cycle.

The microprocessor 120 executes an operating system ("OS") 118. In preferred embodiments, the OS 118 is Linux™, although other operating systems (e.g., iOS™, WebOS™, Android™, etc.) could also be used. The OS 118 allows programs to be run on the microprocessor 120 and controls low-level operations such as an IP stack and file system support. Running on the OS 118 of the microprocessor 120 is a UI Controller 122. The UI Controller 122 handles, among other things, user interface rendering and processing of the data to be rendered on the display 112 through a UI module 124, which may be a part of the UI Controller 122. The display 112 displays application's user interface. The device 100 may also include components such as a voice engine, a connection manager, a power management module, etc.

Figure 2:
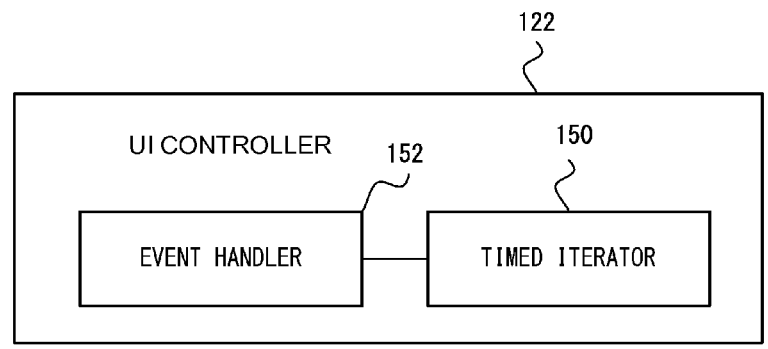
FIG. 2 is a logical diagram of a UI controller, according to one embodiment of the present invention.

FIG. 2 illustrates a block diagram of the UI controller 122. The UI controller 122 may include an event handler 152 to process, among other things, events that are generated in response a user's interaction with the UI of the device 100. A timed iterator 150 is also included in the UI controller 122. Alternatively, the timed iterator 150 may also be included in any other module that is coupled to the OS 118. In an alternative embodiment, the timed iterator 150 may be embedded in a hardware module that is coupled to the CPU 120. The timed iterator 150 provides a time bound task processing functionality. For example, a list of tasks may be given to the timed iterator 150 for processing, along with a time constraint. The time iterator 150 is configured to process as many tasks as the timed iterator 150 can process in the specified time duration and then relinquishes the control to the event handler (or any other module that called the timed iterator). Of course, if the timed iterator 150 is able to finish all tasks before the timeout, as set by a caller, the timed iterator 150 relinquishes control before the timeout occurs.

Figure 3:
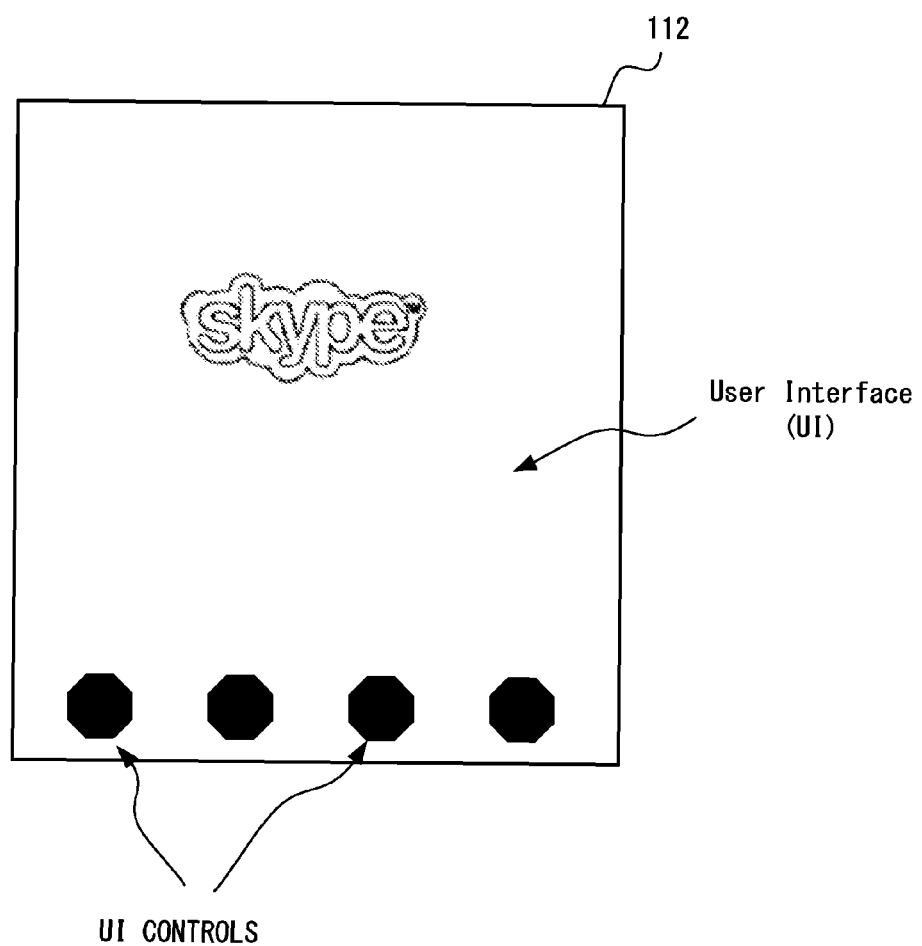
FIG. 3 illustrates an exemplary UI of a mobile device, according to one embodiment of the present invention.

FIG. 3 illustrates an exemplary user interface (UI) of the mobile device 100. The UI includes UI controls to enable users' interaction with the mobile device 100. Many popular mobile phones (e.g., iPhone™, etc.) include most of the control buttons and keypad built into software. For example, traditionally, the UI controls shown in FIG. 3 used to be hardware based and controlled by separate hardware/processing modules. Hence, these controls would remain operational even during the periods in which the UI was busy (that is, the UI thread is busy performing some tasks) due to some background data processing. However, having these controls in software poses an issue in that if the UI is busy, the UI controls may not be used during a period of time until the UI relinquishes the control back to the event handler 152, in one example. This problem could be solved using a multithreaded application architecture. However, as discussed previously, having multiple threads and other processes that consumes excess power are disfavored in order to prolong battery recharge cycles.

In some other types of devices (such as devices running on Android™), user interactions with the device are monitored separately from the application thread and the user is given a choice to either wait for the application to finish or abort the application. Even though this method may be suitable for aborting "hanging" applications, aborting an application may not be desirable if the user desires the application to finish the assigned tasks yet allowing the user to continue interacting with the application.

Figure 4:
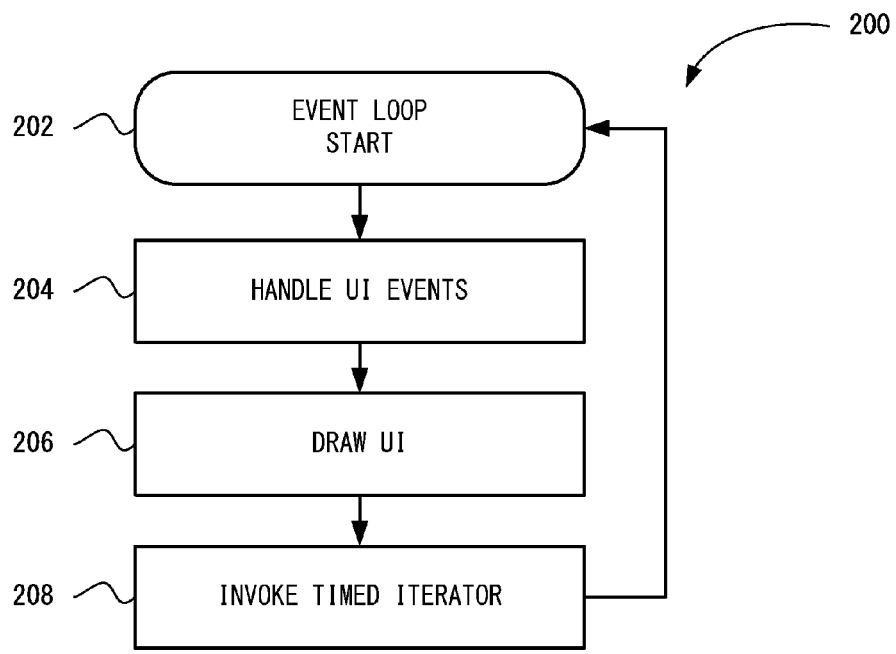
FIG. 4 illustrates a flow diagram of invoking a timed iterator module, according to one embodiment of the present invention.

Referring now to FIG. 4, which illustrates a flow diagram 200 for invoking the timed iterator 150. In a preferred embodiment, at step 202, event loop starts. Event loop is typically started when an application is invoked. At step 204, the application handled UI events. For example, a user may want to retrieve a list of all her/his contacts from a server and display them on the display. At step 206, the application draws the user interface according to the data display requirements. At 208, the timed iterator 150 is invoked, without spawning another thread, to handle selected enumerated tasks (such as data retrieval, data display as the data is being retrieved, etc.).

Figure 5:
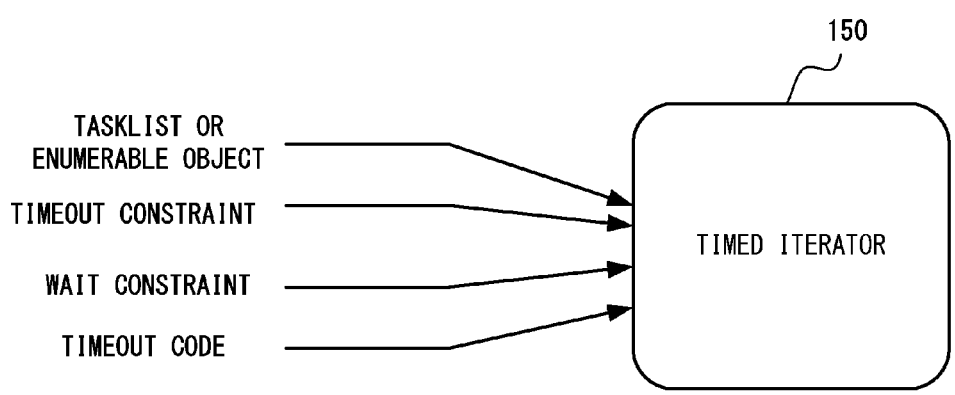
FIG. 5 illustrates an interface of the timed iterator, according to one embodiment of the present invention.

FIG. 5 illustrates an exemplary interface of the timed iterator 150. In one embodiment, a caller of the timed iterator 150 needs to input to the timed iterator 150, a task list. The task list includes a list of tasks that the caller wants the timed iterator to process. The task list may be in the form of an enumerable object. In another embodiment, a user defined object having a custom interface may be used to encapsulate the task list. A person skilled in the art would realize that other methods may be used to encapsulate the task list.

In one embodiment, the enumerable object or the task list that is inputted to the timed iterator 150 may include child objects having a predefined interface. For example, each of these child objects may include a method named "run." The timed iterator 150 may iterate through these child objects one by one and invoke the "run" method on each of them. In another example, each of the child objects may include a method that provides information and instructions to the timed iterator 150 as to how to perform the task that is encapsulated in the child object. The timed iterator 150 may interact with other modules of the device 100 and external services through the Internet or a data network. A person skilled in the art would realize that other methods may be used to iterate through the task objects and perform the tasks encapsulated in each of these task objects.

A timeout constraint is also inputted to the timed iterator 150. The timed iterator 150 executes the tasks in the inputted task list for the duration specified in the inputted time constraint and then relinquishes the control back to the caller. The caller may decide to give the control back again to the timed iterator 150 if the caller determines that no other event needs to be handled. In one embodiment, the time out constraint could be configurable by the user and may vary from milliseconds to several seconds.

In one embodiment, a wait constraint may also be inputted to the timed iterator 150. If a wait constraint is inputted to the timed iterator 150, the timed iterator 150 is configured to wait for the time period specified in the wait constraint after the timeout period expires before entering into the next event loop pass. This optional wait constraint allows handling of user and UI events before the control goes into the next event loop pass.

In another embodiment, a timeout code may be supplied to the timed iterator 150. The timed iterator 150 executes this timeout code after the timeout, as specified in the timeout constraint, prior to relinquishing the control to the caller or before starting to into a wait mode for the duration as specified in the wait constraint. The timeout code may be a script or other type of executable code. Alternatively, the address of a callback function may be passed to the timed iterator 150 through the timeout code variable. A null value may also be passed to indicate that the timed iterator 150 should simply relinquish the control to the caller without any pre-processing. It should be noted that a person skilled in art would appreciate that the timed iterator 150 may be customized to add more inputs according to specific needs of some applications. For example, through the timeout code, the timed iterator 150 may be instructed to preserve the task list for the next event loop pass. In another embodiment, the timed iterator 150 is configured to maintain a log file containing messages and information for the purpose of monitoring the results of prior executions of the timed iterator 150. The timed iterator 150 may also be configured to send notifications to a monitoring module (not shown) for the purpose of monitoring the operations of the timed iterator 150.

In alternative embodiments, the timed iterator 150 may also include backend interfaces to enable the timed iterator 150 to interact with data sources inside or outside of the mobile device 100.

Figure 6:
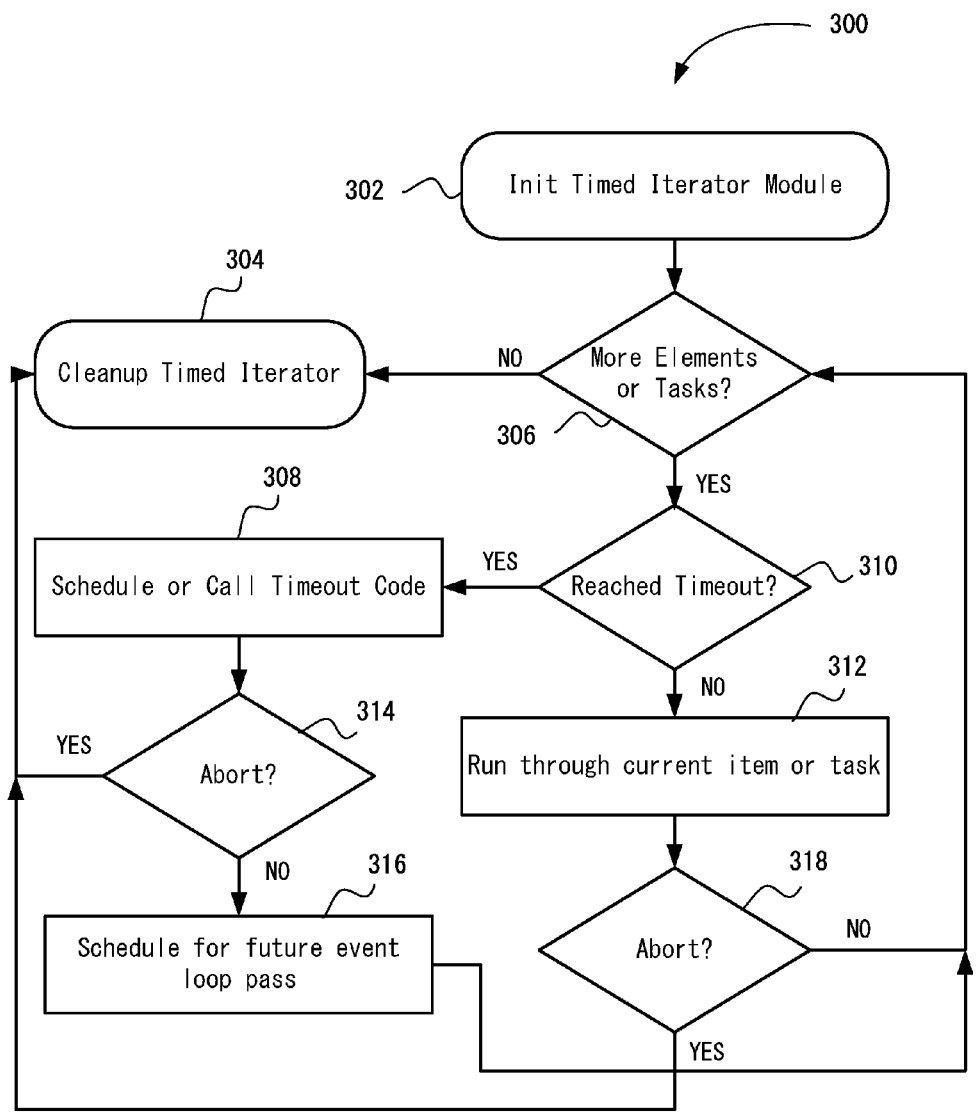
FIG. 6 illustrates a flow diagram depicting the execution of the timed iterator, according to one embodiment of the present invention.

Referring now to FIG. 6, which depicts a flow diagram 300 for the execution of the timed iterator 150. Accordingly, at step 302, the timed iterator is initialized. The initialization may include loading the software module that include the timed iterator 150 in the processor's main memory and inputting at least an enumerable object or a task list and a timeout constraint into the timed iterator 150. At decision step 306, a determination is made if there is any task remaining to be processed. If a task is remaining to be processed, at decision step 310, a determination is made whether the inputted timeout has reached. At step 306, if no other task is remaining to be performed, at step 304, the timed iterator is cleaned up. The cleaning up of the timed iterator may include initializing internal variables. The cleaning up may also include removing the module that include the timed iterator from the main memory of the processor.

At step 310, if a determination is made that the timeout has been reached, at step 308, the timeout code is called. Optionally, the timed iterator may be scheduled to run in a future event loop pass. At decision step 314, a determination is made if the time timeout code includes instructions for the timed iterator to abort. If yes, a clean up is performed at step 304, as described above. If no, the timed iterator is scheduled to run in a future event loop pass.

At decision step 310, if the timeout is not reached yet, at step 312, the timed iterator 312 performs the current task. At optional decision step 318, a determination is made whether to abort after finishing the current task. If yes, then the control goes to step 304 to clean up the timed iterator, as described above. If no, then the control goes back to step 304.

In one embodiment, the process 300 is performed exactly as recited. However, in other embodiments, various process steps may be rearranged and executed in different sequences. A person skilled in the art would realize that the process 300 may be performed in other ways without substantially deviating from the essence of what is described above.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

I claim:

1. A computer implemented method for processing tasks, comprising:

invoking a timed iterator by a caller in an execution thread, during a pass through an event loop, without spawning a new thread, the invoking including:
passing a task list and a timeout constraint to the timed iterator, the task list being an enumerable object including one or more child objects; and
passing timeout code to the timed iterator;

executing, by the timed iterator in the execution thread, the one or more child objects in the task list for a period of time as specified in the timeout constraint, the executing comprising invoking a method of at least one of the child objects;

executing the timeout code after the period of time and prior to relinquishing program control to the caller, wherein the timeout code includes at least one of a script, programming instructions or a callback address of a method call for the timed iterator to schedule remaining child objects in the task list to be performed in a next pass through the event loop; and relinquishing program control to the caller in the execution thread after the period of time.

2. The computer implemented method of claim 1, wherein the invoking further includes passing a wait constraint to the timed iterator.

3. The computer implemented method of claim 2, wherein the timed iterator is configured to wait for a time specified in the wait constraint before a next pass through the event loop.

4. The computer implemented method of claim 1, wherein the timed iterator is configured to execute the timeout code prior to the relinquishing.

5. The computer implemented method of claim 1, wherein the timed iterator is configured to maintain a log file comprising information for monitoring results of prior executions of the timed iterator.

6. The computer implemented method of claim 1, wherein the method is performed by a mobile device.

7. The computer implemented method of claim 1, wherein the method is performed by a mobile radio communication device.

8. A mobile computing device, comprising:
a processor;
an operating system executable by the processor; and
a user interface controller executable in a thread of the operating system, the user interface controller including an event handler and a timed iterator, the user interface controller configured to perform operations comprising:
invoking the timed iterator by the event handler in the execution thread during a pass through an event loop, without spawning a new thread, the invoking including:
passing a task list and a timeout constraint to the timed iterator, the task list being an enumerable object including one or more child objects; and
passing timeout code to the timed iterator;
executing, by the timed iterator in the execution thread, the one or more child objects in the task list for a period of time as specified in the timeout constraint, the executing comprising invoking a method of at least one of the child objects;
executing the timeout code after the period of time and prior to relinquishing program control to the caller, wherein the timeout code includes at least one of a script, programming instructions or a callback address of a method call for the timed iterator to schedule remaining child objects in the task list to be performed in a next pass through the event loop; and
relinquishing program control by the timed iterator to the event handler after the period of time.

9. The mobile computing device of claim 8, wherein the invoking further includes passing a wait constraint to the timed iterator.

10. The mobile computing device of claim 9, wherein the timed iterator is configured to wait for a time specified in the wait constraint before a next pass through the event loop.

11. The mobile computing device of claim 8, wherein the timed iterator is configured to execute the timeout code prior to the relinquishing.

12. The mobile computing device of claim 8, wherein the timed iterator is configured to maintain a log file comprising information for monitoring results of prior executions of the timed iterator.

13. The mobile computing device of claim 8 further comprising a battery configured to power the processor.

14. The mobile computing device of claim 8 further comprising a battery configured to power the processor and an antenna to permit radio communication.

15. A non-transitory computer-readable storage medium containing a program which, when executed, performs operations comprising:
invoking a timed iterator by a caller in an execution thread, during a pass through an event loop, without spawning a new thread, the invoking including:
passing a task list and a timeout constraint to the timed iterator, the task list being an enumerable object including one or more child objects; and
passing timeout code to the timed iterator;
executing, by the timed iterator in the execution thread, the one or more child objects in the task list for a period of time as specified in the timeout constraint, the executing comprising invoking a method of at least one of the child objects;
executing the timeout code after the period of time and prior to relinquishing program control to the caller, wherein the timeout code includes at least one of a script, programming instructions or a callback address of a method call for the timed iterator to schedule remaining child objects in the task list to be performed in a next pass through the event loop; and
relinquishing program control to the caller in the execution thread after the period of time.

16. The computer-readable storage medium of claim 15, wherein the invoking further includes passing a wait constraint to the timed iterator.

17. The computer-readable storage medium of claim 16, wherein the timed iterator is configured to wait for a time specified in the wait constraint before a next pass through the event loop.

18. The computer-readable storage medium of claim 15, wherein, the timed iterator is configured to execute the timeout code prior to the relinquishing.

19. The computer-readable storage medium of claim 15, configured to be used with a mobile, battery powered device.

20. The computer-readable storage medium of claim 15, configured to be used with a mobile, battery powered radio communication device.

* * * * *